(12) United States Patent
Poulard et al.

(10) Patent No.: US 12,730,895 B2
(45) Date of Patent: Sep. 8, 2026

(54) APPARATUSES AND METHODS FOR VERIFICATION OF UPDATED DATA-SET

(71) Applicant: NXP B.V., Eindhoven (NL)

(72) Inventors: Fabrice Poulard, Houilles (FR); Sören Heisrath, Horneburg (DE); Timotheus Arthur van Roermund, Hamburg (DE)

(73) Assignee: NXP B.V., Eindhoven (NL)

( * ) Notice: Subject to any disclaimer, the term of this patent is extended or adjusted under 35 U.S.C. 154(b) by 548 days.

(21) Appl. No.: 18/342,856

(22) Filed: Jun. 28, 2023

(65) Prior Publication Data

US 2024/0031143 A1 Jan. 25, 2024

(30) Foreign Application Priority Data

Jul. 25, 2022 (EP) .................................... 22306109

(51) Int. Cl.

| | |
|---|---|
| ***G06F 21/57*** | (2013.01) |
| ***G06F 21/44*** | (2013.01) |
| ***H04L 9/08*** | (2006.01) |
| ***H04L 9/32*** | (2006.01) |
| ***H04L 9/40*** | (2022.01) |

(Continued)

(52) U.S. Cl.

CPC .............. *G06F 21/57* (2013.01); *G06F 21/44* (2013.01); *G06F 21/577* (2013.01); *H04L 9/0869* (2013.01); *H04L 9/32* (2013.01); *H04L 63/0428* (2013.01); *H04L 63/123* (2013.01); *G06F 21/565* (2013.01); *G06F 21/78* (2013.01)

(58) Field of Classification Search

CPC ........ G06F 21/44; G06F 21/57; G06F 21/565; G06F 21/577; G06F 21/62; G06F 21/64; G06F 21/78; H04L 9/0869; H04L 9/32; H04L 63/0428; H04L 63/123; H04L 63/12; H04L 9/3236; H04L 9/3242

See application file for complete search history.

(56) References Cited

U.S. PATENT DOCUMENTS 5,671,236 A * 9/1997 Denissen .............. H03M 13/31 714/781
8,880,898 B2 11/2014 Smeets
9,910,659 B2 3/2018 Krishnamurthy et al.

(Continued)

FOREIGN PATENT DOCUMENTS

EP 3333747 A1 6/2018

OTHER PUBLICATIONS

Autosar®; "Specification of Secure Hardware Extensions"; Autosar FO R19-11; Document ID No. 948; Nov. 28, 2019.

*Primary Examiner* — Shaqueal D Wade-Wright

(57) ABSTRACT

A circuit includes a secure chip storing one of an enclave of key values linked to an update code; a memory to store an updatable data set including an update value, which corresponds to and is revised with the update code; and a logic circuit. The logic circuit is configured to provide a key value based on a revision to the update code from the enclave of key values, generate an authentication tag as a function of the key value, use the authentication tag to verify that the updatable data set is valid and current before using the updatable data set in an application, and update the data set by storing a replacement updatable data set including a revised update value in the memory circuit. The revised update value corresponds to a revised update code to provide another key value from the enclave of key values.

20 Claims, 7 Drawing Sheets

(51) Int. Cl.
*G06F 21/56* (2013.01)
*G06F 21/78* (2013.01)

(56) References Cited

U.S. PATENT DOCUMENTS

| | | | | |
|---|---|---|---|---|
| 9,965,268 | B2 | 5/2018 | Kawazu | |
| 10,009,325 | B1 * | 6/2018 | David | H04L 9/16 |
| 10,635,820 | B1 | 4/2020 | Gallinghouse et al. | |
| 10,701,102 | B2 * | 6/2020 | Zeng | H04L 63/062 |
| 11,228,421 | B1 * | 1/2022 | Mesh | G06F 21/36 |
| 2015/0261716 | A1 * | 9/2015 | Craddock | G06F 13/28 710/308 |
| 2018/0060607 | A1 * | 3/2018 | Tasher | G06F 21/64 |
| 2019/0278914 | A1 | 9/2019 | Le Roy et al. | |
| 2020/0342075 | A1 * | 10/2020 | Nethery | G06F 21/629 |
| 2020/0372157 | A1 | 11/2020 | Singer et al. | |
| 2021/0192014 | A1 * | 6/2021 | Yamaguchi | H04L 9/3247 |
| 2023/0103115 | A1 * | 3/2023 | Friesen | G06F 8/65 713/153 |
| 2024/0061938 | A1 * | 2/2024 | Briongos | G06F 21/57 |
| 2024/0104194 | A1 * | 3/2024 | Santinelli | G06F 21/53 |

* cited by examiner

APPARATUSES AND METHODS FOR VERIFICATION OF UPDATED DATA-SET

CROSS-REFERENCE TO RELATED APPLICATIONS

This application claims priority under 35 U.S.C. § 119 to European Patent Application No. 22306109.4, filed on Jul. 25, 2022, the contents of which are incorporated by reference herein.

OVERVIEW

Aspects of various example embodiments are directed to an information processing apparatus and related methods to prevent attacks on the data sets stored in memory (e.g., sets of codes, firmware, software, etc.) tor the apparatus. As one example applicable to when one or more of the data sets are updated from one version of the data set to the next, such exemplary aspects of the present disclosure are to address the data set(s) from being returned to a previous version. This type of application is sometimes referred to as a "rollback" attack, in which the attack causes the data set to roll back to an older version. While not necessarily limited in this regard, for purposes of a better understanding, aspects of the present disclosure are discussed using this type of application in which a data set may be subject to a rollback attack.

Logic circuits as used in data processing apparatuses, such as a computers and at least partially programmable logic circuits, oftentimes use a protocol to update the data set and in many instances such as when the update may occur via a remote network, the protocol may be designed to prevent rollback of the data set. Such rollback may be detected, for example, by comparing old versus new version numbers of the data sets saved in memory so as to know whether the newest data set is installed or should be installed as an update. For example, if the version number of a recently delivered data set has an old version number and the version number of the current dataset saved in the memory has a more recent version number, a rollback attack is readably detectable and a scheduled update of the data set may be cancelled. Such version numbers may also be tracked by way of controlling counters (e.g., monotonically increasing a counter each time a correct and more-recent version of the dataset is installed) and comparing the counter's count to the version number stored with the data set which is commonly stored in the memory with the dataset to be installed.

In such situations, however, a rollback attack is still possible so long as the memory circuit is accessible for the attack to manipulate the correct version number being tracked by the apparatus or application circuit. This attack situation may occur, for example, if the attack manipulates the version number by replacing the version number with an incorrect older version number. As another example, this attack situation may also occur if the attack is able to manipulate or fool a counter which is being used to track the correct version number.

In a more specific context, a rollback may occur in connection with a data set used in a MCU or MPU equipped with a secure enclave. In this context, the data set may be used by an application software for system configuration purposes. As such, the data set may be stored in NVM (non-volatile memory) which may be embedded or external Flash memory, with a proof of authenticity in a form of a cryptographic authentication tag (e.g. a CMAC calculated over the data set). Before using the data set, the application can confirm the data set is valid by verifying the authentication tag over the data set. Whenever the data set is updated, the application can recalculate a new authentication tag and store it in NVM along with the data set. Since the data set can evolve over time, it may have a validity date. In a rollback attack, an adversary may reprogram (e.g., in NVM) a valid but outdated data set, for example, to re-enable features that have been disabled over time.

These and other matters have presented challenges to circuits having data sets which are to be updated and validated without being subjected to spoofing, rollback errors and other spurious attacks.

SUMMARY

Various example embodiments are directed to issues such as those addressed above and/or others which may become apparent from the following disclosure. Certain specific aspects in this context address issues in a computing processor, in which a certain data set is used by application software for system operational or configuration purposes. For example, such a computing processor may refer to or include an MCU (microcomputer or master control unit), a MPU (microprocessor unit) equipped with a secure enclave), and/or logic circuitry that includes an embedded-flash-type MCU. The data set may be stored in non-volatile memory (NVM) with a proof of authenticity in a form of a cryptographic authentication tag (e.g., a CMAC calculated over the data set). An adversary may reprogram (e.g., in NVM) a valid but outdated data set (e.g., re-enable features that have been disabled over time). This issue is often described as a replay or rollback attack.

In more specific examples, aspects of the present disclosure are applicable to a variety of applications wherein the circuitry includes an MCU or MPU featuring a secure enclave that supports the API (application-program interface) defined in a specification for a secure hardware extension (SHE) which may benefit from protection of data sets stored in embedded or external NVM against replay or rollback attacks. By using the data set and the key used to authenticate its content, the data set is protected from such an attack. In certain specific examples involving implementations that use a SHE specification with a specified key update counter, the key update counter may be indirectly used as the anti-rollback reference counter.

In certain example embodiments, aspects of the present disclosure are directed to apparatuses (e.g., system, circuits, devices) and methods for using such apparatuses, wherein such an apparatus includes: an integrated circuit (IC), or a chip, having a secure enclave (e.g., a secure subsystem within a chip) to store one of an enclave of key values linked to an update code; a memory circuit to store an updatable data set including the update value which corresponds to and is revised with the update code; and a logic circuit. In certain examples, the logic circuit may be realized by distinct components including the application software and the security subsystem and, in more specific examples, the logic circuit may be configured to: provide a key value, based to a revision to the update code, from among the enclave of key values, generate an authentication tag as a function of the provided key value, use the authentication tag to verify that the updatable data set is valid and up to date before using the updatable data set in an application specified for the updatable data set, and update the data set by storing a replacement updatable data set in the memory circuit and including, in the replacement updatable data set, a revised update value which corresponds to a revised update code that is used to provide another key value from among the enclave of key values.

In a manner consistent with the above circuit-directed characterization, a method-based aspect of the present disclosure includes: storing, via a secure chip, one of an enclave of key values linked to an update code; storing, via a memory circuit, an updatable data set including the update value which corresponds to and is revised with the update code; and using a logic circuit to: provide a key value, based to a revision to the update code, from among the enclave of key values, generate an authentication tag as a function of the provided key value, using the authentication tag to verify that the updatable data set is valid and up to date before using the updatable data set in an application specified for the updatable data set, and update the data set by storing a replacement updatable data set in the memory circuit and including, in the replacement updatable data set, a revised update value which corresponds to a revised update code that is used to provide another key value from among the enclave of key values.

Whether for the above circuit- or method-directed characterization, more particular aspects (based on one or more of the circuit- or method-directed aspects), one or more other (more-detailed) aspects may be used to so characterize. As examples, the above-described function may be a random code generation function applied on the provided key value to generate the authentication tag, and the logic circuit may be configured to transition to a data-set protection mode before generating the authentication tag as a function of the provided key value. Also, the authentication tag may be a cipher-based message authentication code (CMAC). In addition, the logic circuit may be configured: to respond to the authentication tag being generated, by discarding or erasing the provided key value; to use the provided key to provide verification via use of the authentication tag over the data set, and with the authentication tag to be accessible by the logic circuit only for said verification, and to set security flag value which is selected from among a plurality of security flag values to indicate a status of the authentication code, wherein the plurality of security flag values (e.g., one, two or more of a boot_protection status, a verification_only status, a key_usage status, and a debugger protection status).

Other examples (which may be implemented alone or as one or more aspects together) in this regard include: the update value being the same value, and wherein the authentication tag is generated as a random function of the provided key value; the update value being bound to the update code by a function which is traceable by the provided key value; and wherein after generation of the provided key value, the provided key value is secured in nonvolatile memory circuit to allow the logic circuit to provide said other key value from among the enclave of key values for an update of the data set.

In connection with other example embodiments, the present disclosure is directed to more-specific aspects of the update code and the revised update code (and these more-specific aspects may also be used with the above-described aspects). In certain examples, each of the update code and the revised update code is an integer represented by N bits, and wherein each of the update value and the revised update value is an integer represented by N bits (e.g., N is greater than or equal to eight, or thirty two). For example, each of the update code and the revised update code may be the same integer, or the update code may be different than the revised update code. In certain other examples, each of the update code and the update value may correspond to a counter value that is represented by an integer having a number of bits that is greater than or equal to 12 and/or that is augmented with each instance in which the logic circuit is to provide one of the key values from among the enclave of key values.

Further, control circuitry may be included as part of the apparatus so as to have the logic circuit and other circuitry, and with the other circuitry to run an application-specific program that uses the updatable data set, wherein said one of the enclave of key values is not exposed to the application-specific program or to the other circuitry. In a more specific example in this regard, the revised update value is provided based on a protocol carried out by the control circuitry, the protocol including: (i) using a first set of messages that specify an identifier of one of the key values to update, wherein the generated authentication tag is a function of the specified identifier; (ii) using a second set of messages to verify that said one of the key values to update has completed successfully; and (iii) in response to verification of said one of the key values updating successfully, replacing: said one of the key values, security flags linked to a status of the authentication code, and the update code with new values securely embedded with certain of the first and second sets of messages.

In certain specific examples, the above-described apparatus is part of or works with a vehicle electronic control unit. In these examples, the secure chip, the memory circuit, and the logic circuit may be integrated with or as part of a secure zone of circuitry within the vehicle electronic control unit, and the secure zone of circuitry may be configured to store and manage at least one of the enclave of key values consistent with a specification or standard for management of security keys within vehicles.

In connection with such vehicle electronic control units, aspects of the present disclosure may be directed to an MCU or MPU featuring a secure enclave that supports the API defined in the Secure Hardware Extension (SHE) specification, which has been adopted by the automotive industry worldwide with a slight evolution of the SHE specification so to introduce an additional key usage flag (VERIFY_ONLY, as discussed supra) as long used by car makers and semiconductor suppliers to the automotive market to offer MCUs and MPUs equipped with SHE-capable secure enclaves. In this specific exemplary context, aspects of the present disclosure use the SHE key update protocol in a certain way to link a data set with the update counter that exist with NVM keys in a SHE-capable secure enclave. In this manner, an application can verify at once that a data set is valid and up-to-date, hence protecting it against the use of outdated data sets.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings for one or more examples in accordance with the present disclosure and in which.

Figure 1:
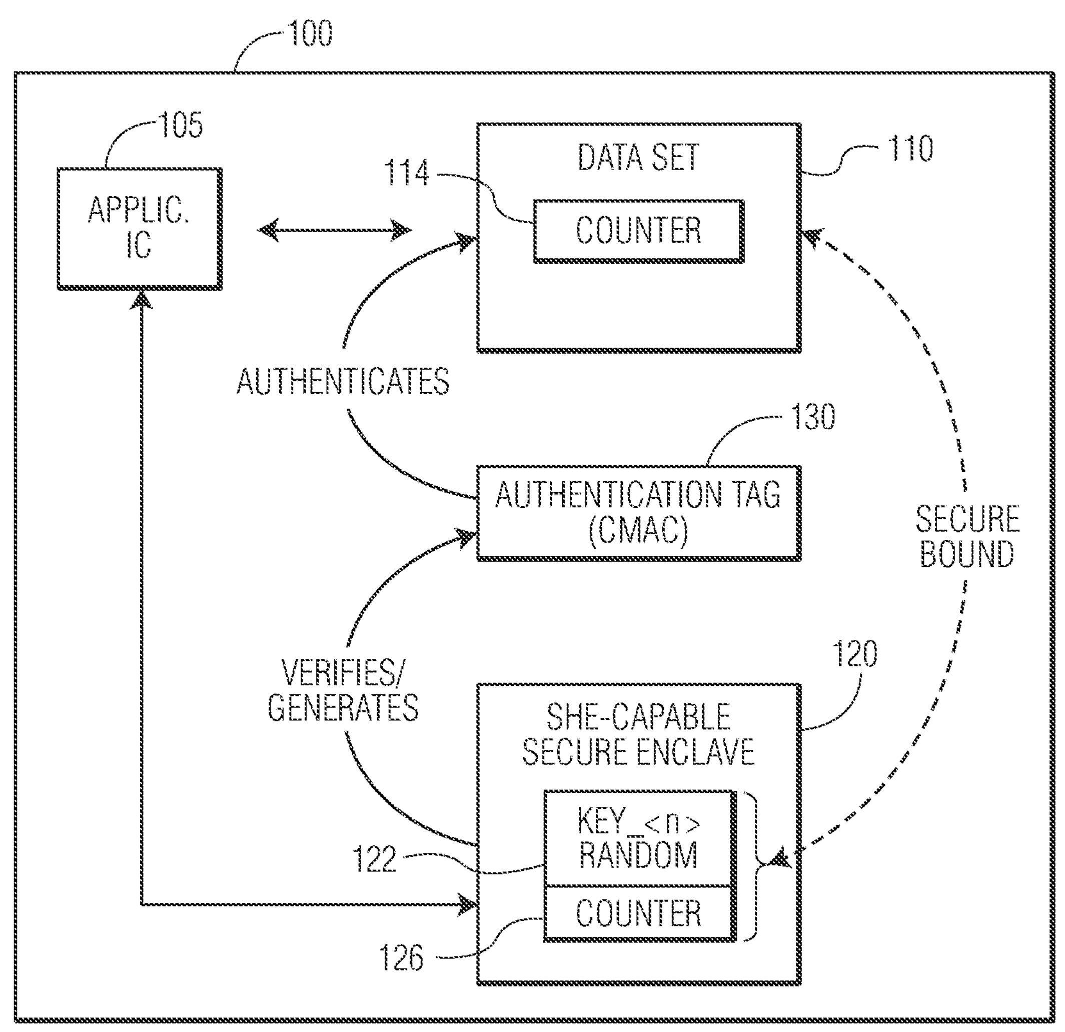
FIG. 1 is a system-level block diagram of a circuit including aspects consistent with an example of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving data sets such as firmware, configuration code, and the like, which may be stored in a memory circuit and subject to errors such as by rollback attacks. In certain implementations, aspects of the present disclosure have been shown to be beneficial when used in the context of circuits designed to comply with specifications involving a secure hardware extension, where secure updates to data sets are expected to occur without improper validation. While not necessarily so limited, various aspects may be appreciated through the following discussion of non-limiting examples which these exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In certain specific example embodiments, example aspects of the present disclosure are directed to circuit-based apparatuses and methods for using circuitry in such apparatuses and in which there is included: a secure chip to store one of an enclave of key values linked to an update code; a memory circuit (or "memory") to store an updatable data set including the update value which corresponds to and is revised with the update code; and a logic circuit. The logic circuit may be configured to: provide a key value, based to a revision to the update code, from among the enclave of key values, generate an authentication tag as a function of the provided key value, use the authentication tag to verify that the updatable data set is valid and up to date before using the updatable data set in an application specified for the updatable data set, and update the data set by storing a replacement updatable data set in the memory circuit and including, in the replacement updatable data set, a revised update value which corresponds to a revised update code that is used to provide another key value from among the enclave of key values.

In many applications according to the present disclosure, the secure chip, the logic circuit and the memory may be integrated into a single chip or tightly integrated as set of multiple chips. As non-limiting examples, such circuitry may include an MCU or MPU featuring a secure enclave that supports the API (application-program interface) defined in a specification for a secure hardware extension (SHE) which may benefit from protection of data sets stored in embedded or external NVM against replay or rollback attacks. As one of many examples of a single-chip microcontroller which may be used in these example contexts, reference may be made to the MPC5646C single-chip microcontroller (available by Freescale or NXP Semiconductor, Inc.).

By using the data set and the key used to authenticate its content, the data set is protected from such an attack. Certain specific examples have the integrated circuitry including a counter (e.g., update counter) which may use a SHE specification calling for the specified key update counter, and according one aspect of the present disclosure, the key update counter is indirectly used as the anti-rollback reference counter.

In a manner consistent with the above circuit-directed characterization, a method-based aspect of the present disclosure includes: storing, via a secure chip, one of an enclave of key values linked to an update code; storing, via a memory circuit, an updatable data set including the update value which corresponds to and is revised with the update code; and using a logic circuit to: provide a key value, based to a revision to the update code, from among the enclave of key values, generate an authentication tag as a function of the provided key value, using the authentication tag to verify that the updatable data set is valid and up to date before using the updatable data set in an application specified for the updatable data set, and update the data set by storing a replacement updatable data set in the memory circuit and including, in the replacement updatable data set, a revised update value which corresponds to a revised update code that is used to provide another key value from among the enclave of key values.

Whether for the above circuit- or method-directed characterization, more particular aspects (based on one or more of the circuit- or method-directed aspects), one or more other (more-detailed) aspects may be used to so characterize. As examples, the above-described function may be a random code generation function applied on the provided key value to generate the authentication tag, and the logic circuit may be configured to transition to a data-set protection mode before generating the authentication tag as a function of the provided key value. Also, the authentication tag may be a cipher-based message authentication code (CMAC). In addition, the logic circuit may be configured: to respond to the authentication tag being generated, by discarding or erasing the provided key value; to use the provided key to provide verification via use of the authentication tag over the data set, and with the authentication tag to be accessible by the logic circuit only for said verification, and to set security flag value which is selected from among a plurality of security flag values to indicate a status of the authentication code, wherein the plurality of security flag values (e.g., one, two or more of a boot_protection status, a verification_only status, a key_usage status, and a debugger protection status).

Other examples (which may be implemented alone or as one or more aspects together) in this regard include: the update value being the same value, and wherein the authentication tag is generated as a random function of the provided key value; the update value being bound to the update code by a function which is traceable by the provided key value; and wherein after generation of the provided key value, the provided key value is secured in nonvolatile memory circuit to allow the logic circuit to provide said other key value from among the enclave of key values for an update of the data set.

In connection with other example embodiments, the present disclosure is directed to more-specific aspects of the update code and the revised update code (and these more-specific aspects may also be used with the above-described aspects). In certain examples, each of the update code and the revised update code is an integer represented by N bits, and wherein each of the update value and the revised update value is an integer represented by N bits (e.g., N is greater than or equal to eight, or thirty two). For example, each of the update code and the revised update code may be the same integer, or the update code may be different than the revised update code. In certain other examples, each of the update code and the update value may correspond to a counter value that is represented by an integer having a number of bits that is greater than or equal to 12 and/or that is augmented with each instance in which the logic circuit is to provide one of the key values from among the enclave of key values.

Further, control circuitry may be included as part of the apparatus so as to have the logic circuit and other circuitry, and with the other circuitry to run an application-specific program that uses the updatable data set, wherein said one of the enclave of key values is not exposed to the application-specific program or to the other circuitry. In a more specific example in this regard, the revised update value is provided based on a protocol carried out by the control circuitry, the protocol including: (i) using a first set of messages that specify an identifier of one of the key values to update, wherein the generated authentication tag is a function of the specified identifier; (ii) using a second set of messages to verify that said one of the key values to update has completed successfully; and (iii) in response to verification of said one of the key values updating successfully, replacing: said one of the key values, security flags linked to a status of the authentication code, and the update code with new values securely embedded with certain of the first and second sets of messages.

In certain specific examples, the above-described apparatus is part of or works with a vehicle electronic control unit. In these examples, the secure chip, the memory circuit, and the logic circuit may be integrated with or as part of a secure zone of circuitry within the vehicle electronic control unit, and the secure zone of circuitry may be configured to store and manage at least one of the enclave of key values consistent with a specification or standard for management of security keys within vehicles.

In connection with such specific examples according to the present disclosure and involving the SHE specification, an appreciation of further discussion relating to the SHE specification may be gained by way of the following terminology and mechanisms of the SHE API.

Detailed example embodiments may also use SHE keys. A SHE-capable secure enclave (e.g., a secure circuit environment) manages thirteen user keys as listed in the below table. Note that certain SHE-capable secure enclave implementation support additional user keys. Hence the same way with those keys, but it is not described in this document. An application can make use of SHE functions using any key via its SHE key ID. The following Table 1 shows an exemplary list of SHE keys by way of hexadecimal values:

| SHE key ID | SHE key name | Key type |
|---|---|---|
| 0x01 | MASTER_ECU_KEY | User keys in NVM |
| 0x02 | BOOT_MAC_KEY | |
| 0x04 | KEY_1 | |
| 0x05 | KEY_2 | |
| 0x06 | KEY_3 | |
| 0x07 | KEY_4 | |
| 0x08 | KEY_5 | |
| 0x09 | KEY_6 | |
| 0x0A | KEY_7 | |
| 0x0B | KEY_8 | |
| 0x0C | KEY_9 | |
| 0x0D | KEY_10 | |
| 0x0E | RAM_KEY | Ephemeral key |

With regards to Table 1 above and the below provided Table 2 which shows SHE key security flags, several notes may be appreciated as indicated below. Each user key has a 128-bit value. On a virgin device, NVM keys are empty. After reset, the RAM_KEY is empty. The empty key value is implementation-specific: depending on the secure enclave supplier, it can either be 0 (i.e., 128 bits with the value 0) or 0xFFFFFFFF FFFFFFFF FFFFFFFF (i.e., 128 bits with the value 1). Further, each NVM key comes with a set of security flags, as listed in the below table, that define its usage restrictions and update policy.

Table 2 is as follows:

| | Security flags | Value | Description |
|---|---|---|---|
| Write-protection of memory slots | WRITE_PROTECTION | 0 | The key can be provisioned (updated) |
| | | 1 | The key is write protected |
| Disabling keys on boot failure | BOOT_PROTECTION | 0 | The key can be used in all conditions |
| | | 1 | The key cannot be used if secure boot failed |
| Disabling keys on debugger activation | DEBUGGER_PROTECTION | 0 | The key can be used in all conditions |
| | | 1 | The key cannot be used if a debugger is connected |
| Key usage determination | KEY_USAGE | 0 | The key can be used for encryption and decryption |

-continued

| Security flags | | Value | Description |
|---|---|---|---|
| | | 1 | The key can be used for CMAC generation and verification; works in combination with VERIFY_ONLY (see below) |
| Disable wildcard usage for key updates | WILDCARD | 0 | The key can be provisioned without the UID |
| | | 1 | The UID is to be provided when the key is provisioned |

A specific key usage flag may be implemented by SHE-capable secure enclaves to restrict the key for CMAC verification only when KEY_USAGE is set to 1.

Table 1, below, provides an explanation for the security flags used in Key security flag extension.

| Security flags | | Value | Description |
|---|---|---|---|
| CMAC verification usage | VERIFY_ONLY | 0 | The key can be used for CMAC generation and verification |
| | | 1 | The key can be used for CMAC verification only |

Each NVM key features a 28-bit update counter which is to be augmented every time its related key value is updated. The RAM_KEY has no security flag and no update counter. It can be initialized, updated and used without any conditions. SHE key values, update counters and security flags are never directly exposed to the application.

Discussion now turns to the SHE key update protocol. SHE keys can be initialized and updated via the SHE key update protocol. The SHE key update protocol implements the following aspects: three input messages ($M_1$, $M_2$, $M_3$) which specify the identifier of the key to update, wherein the identifier of the key used to authenticate the update (the authentication key), the new key value and attributes (security flags, counter); and two output messages ($M_4$, $M_5$) which can be used by the application to verify that the key update has completed successfully. Presenting $M_1$, $M_2$ and $M_3$ to the SHE-capable secure enclave triggers a key update process. When successful, it replaces the current key, security flags and update counters with new values securely embedded in those messages.

The following table (Table 4) provides acronyms used in the SHE specification.

| Acronym | Description |
|---|---|
| ID | Identifier of the key to update ($K_{ID}$) |
| AuthID | Identifier of the authentication key ($K_{AuthID}$) |
| $K_{ID}'$ | New key value |
| $K_{AuthID}$ | Authentication key value |
| $C_{ID}'$ | New counter value |
| $F_{ID}'$ | New security flag values, the concatenation WRITE_PROTECTION \|\| BOOT_PROTECTION \|\| DEBUGGER_PROTECTION \|\| KEY_USAGE \|\| WILDCARD \|\| VERIFY_ONLY |
| $C_{ID}$ | Current counter value |
| $F_{ID}$ | Current security flag values |
| $CMAC_K(M)$ | CMAC calculation over M using key K |
| $CMAC\_VERIF_K(M, Tag)$ | CMAC verification over M and a (authentication) Tag using key K |
| $ENC_K(M)$ | AES CBC encryption of M using key K (IV = 0) |
| $DEC_K(M)$ | AES CBC decryption of M using key K (IV = 0) |
| $C_{ENC}$ | KDF input constant for deriving an encryption key |
| $C_{MAC}$ | KDF input constant for deriving an authentication key |

The below tables 5, 6, 7 and 8 document the mapping of the input messages $M_1$, $M_2$ and $M_3$. Table 5, for Mapping of $M_1$, is as follows:

| | Bit number | | | |
|---|---|---|---|---|
| | 127~72 | 71~8 | 7~4 | 3~0 |
| Field Size | 56 bits | 64 bits | 4 bits | 4 bits |
| $M_1$ | 0 | UID or 0[Note] | ID | AuthID |

Note that M1 can start with 120 bits to 0 only if WILDCARD in FID is 0; otherwise, the SHE UID (Unique Device Identifier, a 64-bit device-specific value) is to be provided.

Table 6, for Mapping of M2, is as follows:

| | Bit number | | | |
|---|---|---|---|---|
| | 255~228 | 227~223 | 222~128 | 127~0 |
| Field Size | 28 bits | 6 bits | 94 bits | 128 bits |
| $M_{2P}$ | $C_{ID}' > C_{ID}$[Note] | $F_{ID}'$ | 0 | $K_{ID}'$ |

Providing a new counter value below or equal the current counter value terminates the key provisioning with an error. When ID=0x0E (RAM_KEY), this check is discarded.

Table 2, for mapping of M2, is as follows:

| | Bit number 255~0 |
|---|---|
| Field size | 256 bits |
| $M_2$ | $ENC_{K1}(M_{2P})$ |

Table 8, for Mapping of $M^3$, is as follows:

| | Bit number 127~0 |
|---|---|
| Field size | 128 bits |
| $M_3$ | $CMAC_{K2}(M_1 \| M_2)$ |

A key derivation function (KDF) is defined to calculate the sub keys K1 and K2 as follows: K1=KDF($K_{AuhtID}$, $C_{ENC}$), and K2=KDF($K_{AuhtID}$, $C_{MAC}$). In a related figure, the SHE specification illustrates how KDF is a function of K and C, wherein the constants $C_{ENC}$ and $C_{MAC}$ may be used as two 128-bit integers (for a detailed mapping of $M_4$ and $M_5$ and visualization of the related figure, reference may be made to the SHE specification), as follows:

$C_{ENC}$=0x01015348 45008000 00000000 000000B0, and $C_{MAC}$=0x01025348 45008000 00000000 000000B0.

SHE key update policies may also be used in such specific example embodiments according to the present disclosure. A key $K_{ID}$ can be updated based on the knowledge of an authentication key $K_{AuthID}$. For the keys KEY_<n> (with n∈[1, 10]), the authentication key can be: either the MASTER_ECU_KEY or itself (i.e., the current value of KEY_<n>). When a key is initialized the first time, the empty key value is used. A key can be updated only if its current security flag WRITE_PROTECTION is 0. Furthermore, a NVM key can be updated only if the new counter value $C_{ID}'$ is strictly above its current counter $C_{ID}$.

Plain RAM_KEY update. The ephemeral RAM_KEY is the only SHE key that can be initialized or updated unconditionally with a 128-bit integer provided in plain by the application.

SHE functions. A SHE-capable secure enclave supports several user-accessible functions. The below table describes the functions that are used by an example in the present disclosure. This table, Table 9, is for SHE user-accessible functions (as an excerpt), as follows:

| Function name | Purpose |
|---|---|
| CMD_LOAD_KEY | Present the messages $M_1$, $M_2$ and $M_3$ in order to initialize or update a user key |
| CMD_LOAD_PLAIN_KEY | Initialize the RAM_KEY with a plain 128-bit integer |
| CMD_ENC_ECB | Encrypt and decrypt messages of variable |
| CMD_DEC_ECB | length using the ECB ciphering mode |
| CMD_ENC_CBC | Encrypt and decrypt messages of variable |
| CMD_DEC_CBC | length using the CBC ciphering mode |
| CMD_GENERATE_MAC | Generate or verify a CMAC value over a |
| CMD_VERIFY_MAC | message of variable length |
| CMD_RND | Retrieve a 128-bit random value |

A problem in connection with the above-described SHE specification concerns a MCU or MPU equipped with a SHE-capable secure enclave, wherein a data set is used by an application software for system configuration purposes. The use of the data set is generally not limited to system configuration (e.g., in another example embodiment, a data set may refer to or contain a software application). The data set is stored in NVM, which can be embedded or externally connected to the MCU or MPU, contains the configuration information either in plain or encrypted form. The data set is complemented with a proof of authenticity in the form of a cryptographic authentication tag which consists in a CMAC calculated over the data set.

The application can confirm the validity of the data set before using it, by triggering a CMAC verification over its content in the SHE-capable secure enclave. The application can also use the SHE-capable secure enclave to recalculate the CMAC over the data set content every time it is updated. By defining a key policy in the SHE-capable secure enclave, a key to create or verify a CMAC over the data set may remain inaccessible for use to the application until the application is verified by the SHE-capable secure enclave (i.e. as part of a secure boot process or other verification).

Since a CMAC authenticates the data set, it is impossible for an adversary to tamper with its content to illegally influence certain configuration parameters. Any modification in the data set that is not followed by an update of the authentication tag is easily detected by the application. A SHE implementation provides a mechanism to create a CMAC through the CMD_GENERATE_MAC function. Any call to the CMAC generation operation is to be secured to a certain extent such that an illegal application software (i.e., a malware) would not easily modify the data set and reauthenticate it. This problem is partially addressed with a further example embodiment of the present disclosure.

In this system setup, a major problem relates to the inability for the application to detect the use of a valid but outdated data set. An outdated data set contains a valid system configuration (with its authentication tag) which may be viewed as reaching out for an adversary because, for instance, it has more features enabled than the currently used data set. For example: a subscription for a certain service has expired over time, and the related configuration parameters have been removed from the data set.

Moreover, the skilled artisan may find that it is fairly straight forward to replace up-to-date data sets with outdated ones on an external Flash module, and that this may only present a more difficult obstacle to overcome on embedded Flash but not an impossible obstacle.

According to aspects of the present disclosure, the data set and the key used to authenticate its content may be bound in a way to address and overcome such above-discussed issues. In this context, the manner in which the data set and the key used to authenticate its content may be bound includes the following aspects. First, a counter is placed within the data set and that relates to (e.g., equals) the update counter of the key used for the CMAC authentication and generation. As such the key update counter is available for each of the keys managed in a SHE-capable secure enclave as the anti-rollback reference counter. The counter may be, for example, a multi-bit integer (e.g., 28 bits). As a further aspect, a random (or pseudo-random) key value used to authenticate one particular data set.

According to the present disclosure, FIG. 1 illustrates, consistent with the above aspects, the binding of a data set with a SHE-capable-secure enclave by way of a system-level block circuit diagram 100. As part of an integrated circuit including an application-specific circuit 105, the flow diagram of FIG. 1 shows three other parts. The first part is logic circuitry 110 which includes an up-to-date data set to be used by the application-specific circuit 105. The logic circuitry 110 includes a memory (e.g., NVM within 110 but not shown separately) for storing a data set and also includes a so-called "counter" block 114 which includes a special logic circuit configured to track an update version of the data set stored in the memory.

The second part is a secure enclave 120, storing a set of keys, which is capable of generating an authentication tag such as a CMAC-type authentication tag (e.g., compliant with a SHE specification). The secure enclave 120 may also be implemented in the form of logic circuitry including a memory 122 for the keys stored therein, wherein the memory is secure and is different than the memory in the above block 110. Being a secure enclave, the keys correspond to encryption codes (wherein each code or key is specific to a specific encryption code) which the logic circuitry of the secure enclave 120 randomly selects in order to generate an authentication tag (e.g., CMAC) as shown in a third block 130 of FIG. 1. The secure enclave 120 also includes a so-called "counter" 126 which may also be implemented as a logic circuit (not shown in FIG. 1). Either one or each of the counters 114 and 126 may be implemented as an integrated part within the associated logic circuitry 110 or 120. Also, either one or each of the logic circuitry 110 or 120 may be implemented via any one or more of different types of logic circuitries, including as non-limiting examples: an MPU, an MCU, a programmable logic circuit such as a semi-programmable-logic-array circuit, a set of discrete logic components (e.g., flip-flops, latches, AND gates, etc.), and one or more combinations of the foregoing types. In a typical application, the secure enclave 120 may be used indirectly and is it may not be accessed directly by the application-specific circuit 105 while the application-specific circuit is in normal operations (e.g., as an operating system for a vehicle-specific control and/or sensor-monitoring application).

As noted above, block 130 is the third part of FIG. 1. Block 130 illustrates the authentication tag such as in the form of a CMAC, which is generated by the secure enclave 120. The key, as randomly selected from the secure enclave 120, is used to verify the CMAC over the data set is to be accessible for CMAC verification only. If it would be available/enabled to generate new CMACs, then it would be possible for an adversary to change the CMAC for any random data set, hence breaking the bound with the key and its update counter. This implies the use of an intermediate and ephemeral key (RAM_KEY) to generate the CMAC. For the same reason, a random key is chosen and then forgotten (e.g., in the application space) any time the data set is changing. If the same (non-random) key would be used by the application, the rollback protection would not work since the key would verify any CMAC (e.g., not just for the current dataset, but also past retired datasets), thereby again allowing rollback to such previous (retired) datasets. Furthermore, an adversary knowing the key value could generate a CMAC over any random data set. Since the random key is to be forgotten once the CMAC is calculated, the random key is to be saved in NVM in a secure way to calculate the messages M2 and M3 to allow the key update the next time the data set is changing. The role and a feature of the sub keys K1 and K2 is that they do not leak the random value of KEY<n> but can still be used to update it.

In one specific experimental example, the data set format and the data set binding process are implemented according to certain rules. The data set can have any format and any size, it can contain plain or encrypted data, and the data set is to contain a 28-bit counter encoded in plain format (e.g., as opposed to encoded or encrypted relative to a retrieval approach) on a 32-bit word. For the data set binding process, the rules are that the data set content is updated by the application. Once this is done, it is to be bound to the CMAC key used to authenticate its content. It is assumed here that the entire data set is read from NVM and stored in RAM for the update to take place. In practice, however, the data set may be partially read and stored in RAM.

Figure 2:
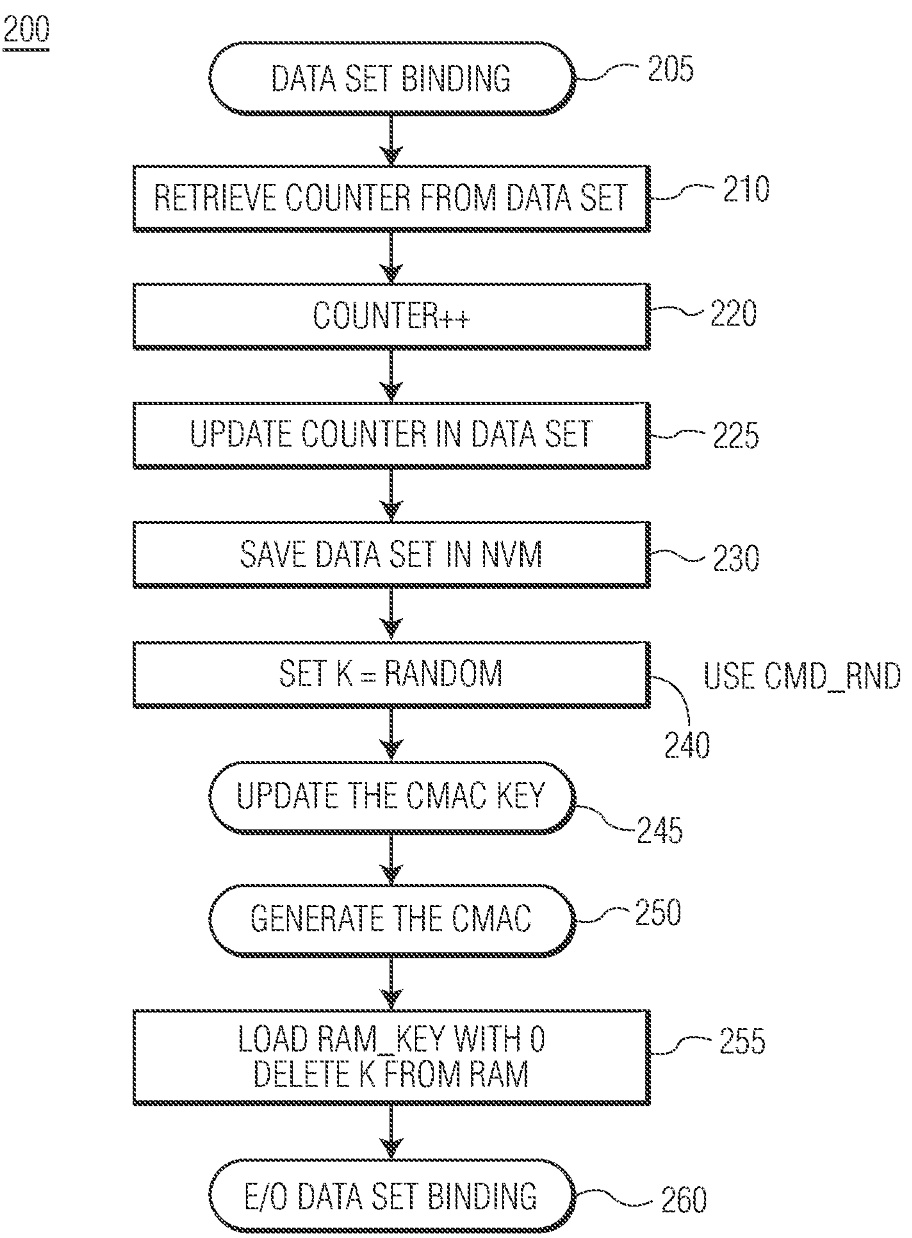
FIG. 2 is a flow chart with exemplary activities for a data set binding method in a system of the type shown in FIG. 1.

Also in accordance with the present disclosure, FIG. 2 is a flow chart 200 illustrating an exemplary set of data flow blocks in connection with a data set binding process which may be implemented for a system of the type implemented in a manner consistent with FIG. 1. As shown at 205 of FIG. 2, the binding process starts with an up-to-date data set while the counter (e.g., 114 of memory 110) has not yet been modified, and from block 205 flow proceeds in from block to block as indicated by the depicted reference numerals. At 210, the counter is retrieved and at 215 incremented by 1. For the first data set initialization, at 220 the counter is set to 1 or otherwise updated as depicted at 225. Once the counter is updated, at 230 the counter is saved to NVM along with the up-to-date data set.

The next step at 240 is to generate a random key K (e.g., 128-bit) that will serve as the CMAC key. The random key is generated using a function CMD_RND (as in the SHE specification) and temporarily stored in RAM. It will be used in both subsequent processes: the CMAC key update (at 245) in the SHE-capable secure enclave, and the CMAC generation (at 250). This random key guarantees that the generated CMAC is unique for that particular image (for that particular counter), and that any CMAC generated previously will not be verified by the new key. As shown at 255, those processes are completed, and then the random key K is deleted from RAM, and the SHE RAM_KEY is cleared to 0. Block 260 indicates the end of the data set binding process.

Figure 3:
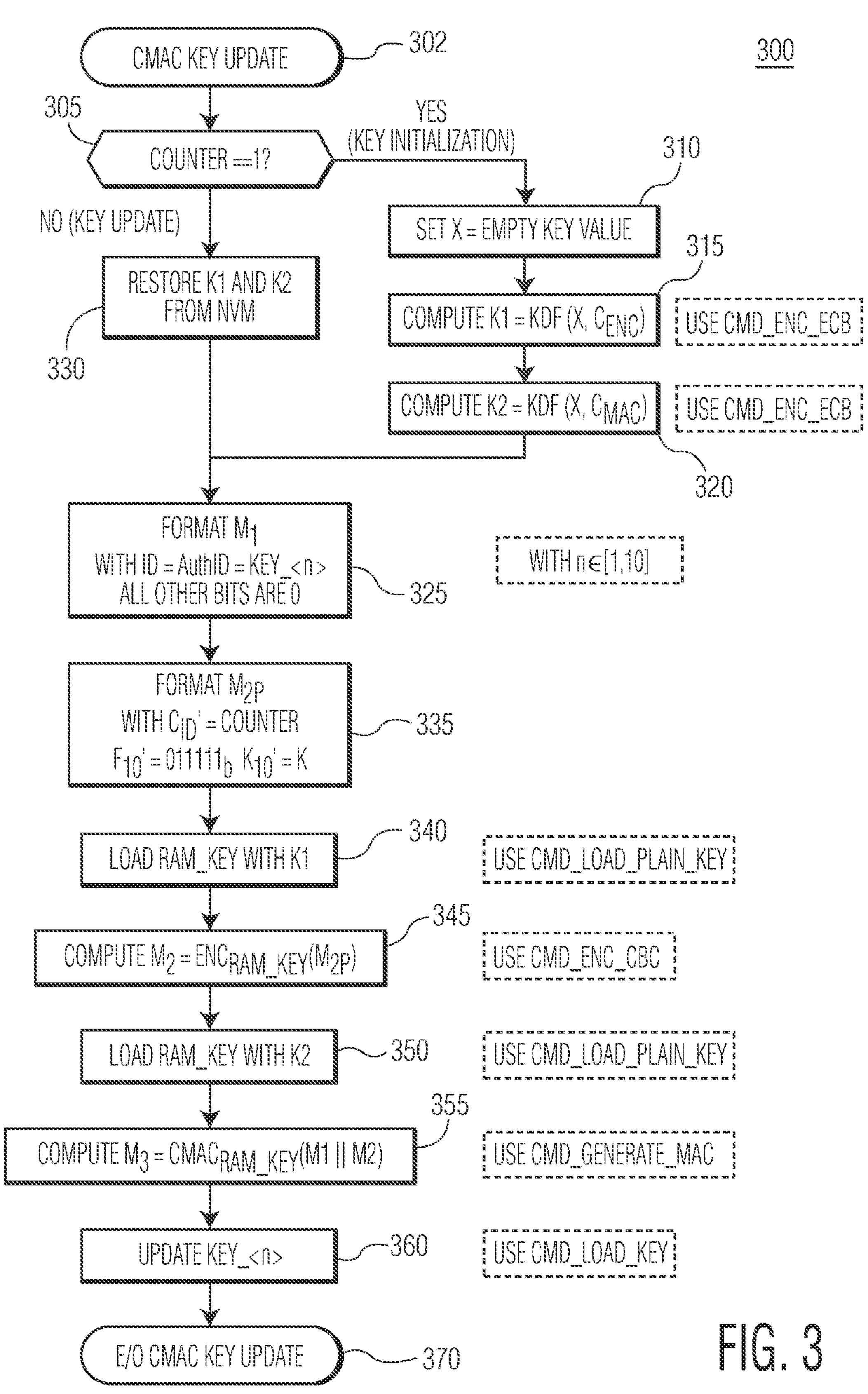
FIG. 3 is a flow chart illustrating exemplary activities for (e.g., CMAC) key-update related aspects in a system of the type shown in FIG. 1.

FIG. 3 is a flow chart 300, as may be carried out by the logic circuitry 130 of FIG. 1, illustrating one of various ways a CMAC key may be generated and/or updated. This particular CMAC key update process starts at block 302, from which flow proceeds to block 305 and from block to block as indicated by the reference numerals depicted in FIG. 3. For a CMAC key update, when entering the CMAC key update process, the counter was incremented by 1. Thus, block 305 depicts a query by the logic circuit to discern if the counter was initialized to 1 and, if so, flow proceeds to block 310 where an X variable is set to an empty key value, then to blocks 315 and 320 where K1 and K2 are computed with K1 being computed as a function of X and CENC, and K2 being computed as a function of X and CMAC (CENC and CMAC are as specified in the SHE specification using CMD_ENC_ECB). From block 320, flow then proceeds back to a sequential flow at block 325.

If the counter was not initialized to 1, a first step shown at 330 is to retrieve the sub key values K1 and K2 that are used to respectively encrypt M2P and authenticate M3. For a first time initialization of the data set (i.e. counter=1), K1 and K2 are computed using KDF and the empty key value, wherein KDF is implemented using the SHE function CMD_ENC_ECB and the RAM_KEY. These key values can be pre-calculated and integrated as constants in the application. For a data set update (i.e. counter>1), K1 and K2 are read from the memory (e.g., NVM) of the logic circuitry (110 of FIG. 1): those values were stored in the memory after a previous CMAC generation process, as discussed in connection with the next section.

The next steps includes formatting the messages M1, M2 and M3 to update the CMAC key. These steps are illustrated at blocks 325, 335, 340, 345 and 350, and may be accomplished by the application making use of the SHE functions CMD_LOAD_PLAIN_KEY (to use RAM_KEY), CMD_ENC_CBC and CMD_GENERATE_MAC (using RAM_KEY as the input key). The CMAC key is selected among the user key KEY_<n> (with n∈[1, 10]). At 325, message M1 is formatted with ID being equal to AuthID=KEY_<n>, where n is an integer from a set of sequential integers from 1 through 10. At 335, message M2P is formatted with CID' being equal to the counter, via the new counter value CID' and with a new security flag value FID' as discussed above in connection with Tables 2-4. At 340, RAM_KEY is loaded with K1 via CMD_LOAD_PLAIN_KEY. At 345, message M2 is computed as a function of the formatted message M2P, shown as ENCRAM_KEY (M2P), via CMD_ENC_CBC. At 350, RAM_KEY is loaded with K2 also via CMD_LOAD_PLAIN_KEY. At 355 message M3 is computed as being equal to CMACRAM_KEY as a function of M1 and M2 (e.g., the logical OR of M1 and M2) via CMD_GENERATE_MAC. Finally, at 360 KEY_<n> is updated.

Table 10, as depicted below, lists the CMAC key security flag values, as one is to be used to set in M2 (FID').

TABLE 10

| CMAC key security flag values | |
|---|---|
| Security flag | Value |
| WRITE_PROTECTION | 0 |
| BOOT_PROTECTION | 1 (recommended) |
| DEBUGGER_PROTECTION | 1 (recommended) |
| KEY_USAGE | 1 |
| VERIFY_ONLY | 1 |
| WILDCARD | 1 |

As previously described, in this particular example implementation, it is important that the CMAC key has its security flag VERIFY_ONLY set to 1: with such configuration, the key can only be used to verify the CMAC over the data set, and not regenerate it. Also this configuration does not apply during the secure key loading operation: the SHE-capable secure enclave can use that key as the authentication key i.e. to decrypt the message M2 and verify the message M3. Its new key value is set with the random K. The authentication key selected is itself. The previous key value is unknown to the application, but the sub keys K1 and K2 linked to that previous key are available to allow the encryption and the authentication of M1 and M2(P). Once all three messages are properly formatted, as an update key step at 360 the formatted messages are sent to the SHE-capable secure enclave using the SHE function CMD_LOAD_KEY. Block 370 indicates the end of the CMAC key update process.

The result of the key update operation can be checked using the messages M4 and M5 returned by the secure enclave (not described here). At this point, the CMAC key is available to be used by the application in CMAC verification operations. As a supplemental security measure, it cannot be used to generate a CMAC. Furthermore, it is recommend to block the key usage if the SHE secure boot process did not verify successfully (BOOT_PROTECTION=1).

Figure 4:
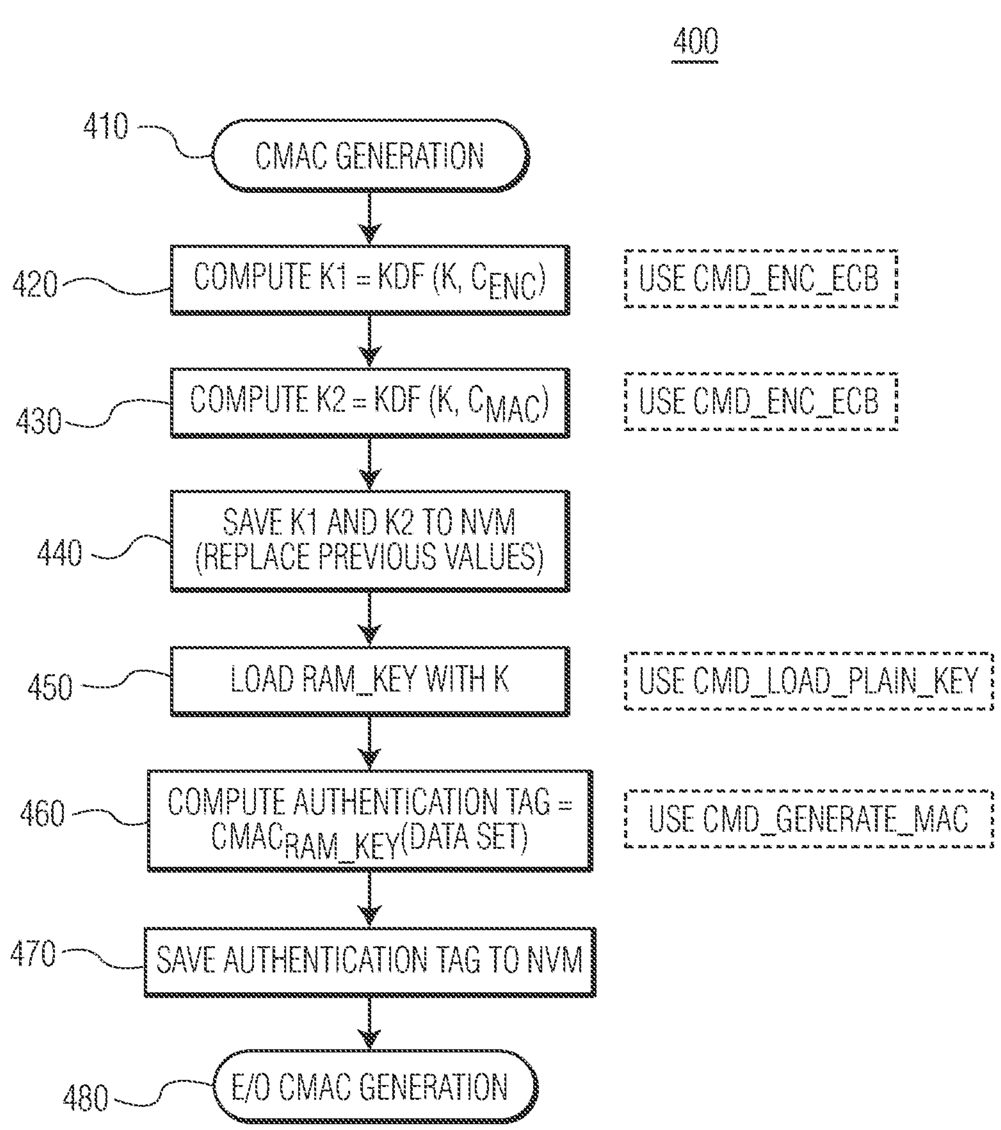
FIG. 4 is a flow chart illustrating exemplary activities for generating an authentication tag (e.g., CMAC) in a system of the type shown in FIG. 1.

FIG. 4 is a flow chart illustrating an exemplary set of activities and/or data flow for a CMAC-generation aspect of a system of the type implemented in a manner consistent with FIG. 1, in accordance with the present disclosure. More specifically, FIG. 4 shows exemplary activities for generating an authentication tag such as a CMAC, for use with a system such as in FIG. 1. When entering the CMAC generation process 400 as at block 410, the up-to-date data set that includes the (updated) counter is stored in the memory of the logic circuitry (e.g., 110 of FIG. 1) such as in available NVM memory. The first substantive steps, at 420 and 430, are to compute the sub key values K1 and K2 that will be used the next time the CMAC key update process is executed. Those keys are derived from the random key K using KDF, which is implemented using the SHE function CMD_ENC_ECB and the RAM_KEY. In certain SHE-capable secure enclave implementation, the KDF is implemented as a SHE function.

Once K1 and K2 are available in RAM, they are saved in the memory as at 440 such as replacements of the previous values. These saved keys do not leak the random key K and are only useful to compute the messages M2 and M3 to update the CMAC key KEY_<n> (at 450) using the SHE function CMD_LOAD_PLAIN_KEY. The next step at 460 involves computing the CMAC over the data set using the SHE function CMD_GENERATE_MAC and the RAM_KEY is loaded with K. Once available, the authentication tag is saved in the (NVM) memory as at 470. At this point (block 480), the data set is protected against illegal update and rollback attack and the CMAC generation process ends.

Figure 5:
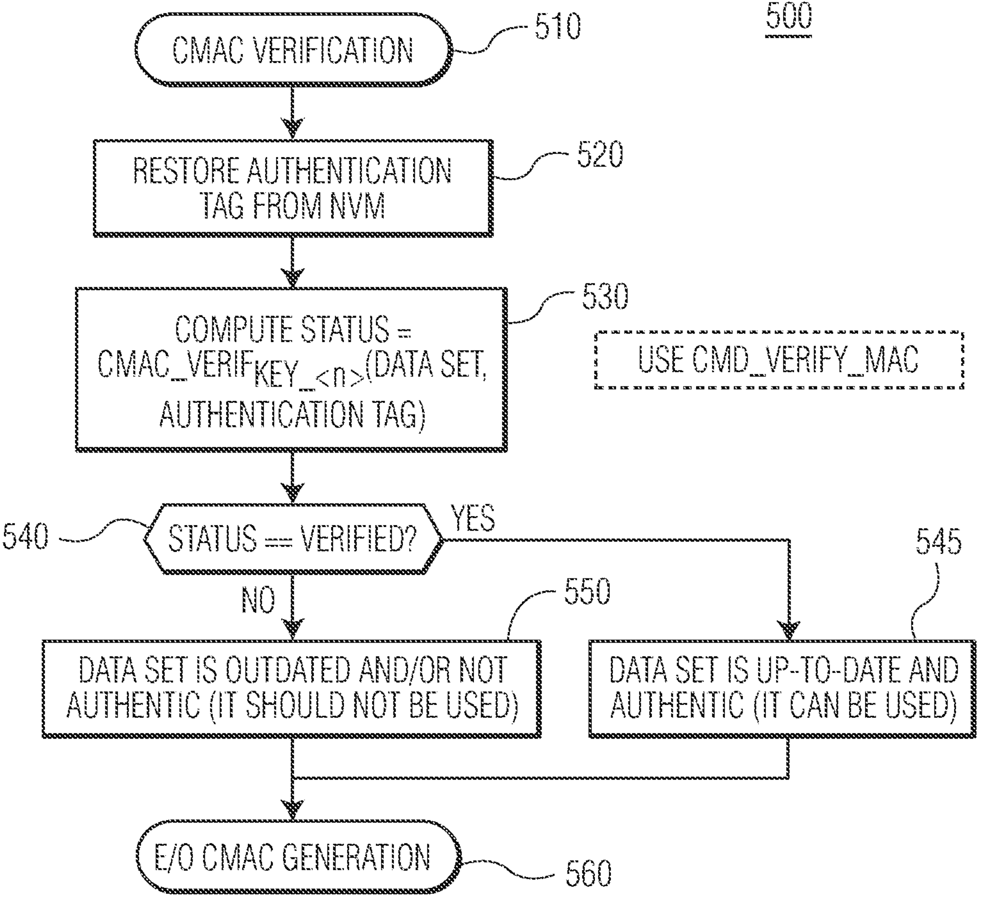
FIG. 5 is a flow chart illustrating exemplary activities for verifying an authentication tag in a system of the type shown in FIG. 1.

To verify the authenticity of a data set, the application uses the SHE function CMD_VERIFY_MAC with the KEY_<n> selected for the CMAC generation. If the CMAC was generated using the previously described process, the application also confirms at the same time that the data set is not outdated. For such a data set authenticity check, FIG. 5 is a flow chart 500 illustrating an exemplary set of activities and/or data flow starting at block 510 for authentication-tag verification aspects of a system of the type implemented in a manner consistent with FIG. 1. More specifically and according to the present disclosure, the flow chart of FIG. 5 may be used for verifying an authentication tag implemented as a CMAC. As illustrated, at block 520 the authentication tag is restored from (NVM) memory and the related status is computed as indicated at block 530. At 540, the logic circuitry performs a query to check if the status is verified. If affirmative, flow proceeds to block 545 indicating that the data set is up to date and can be used. If the status is not verified at block 540, flow proceeds to block 550 indicating that the data set is not up to date and is not to be used. The data flows ends at block 560.

Figure 6:
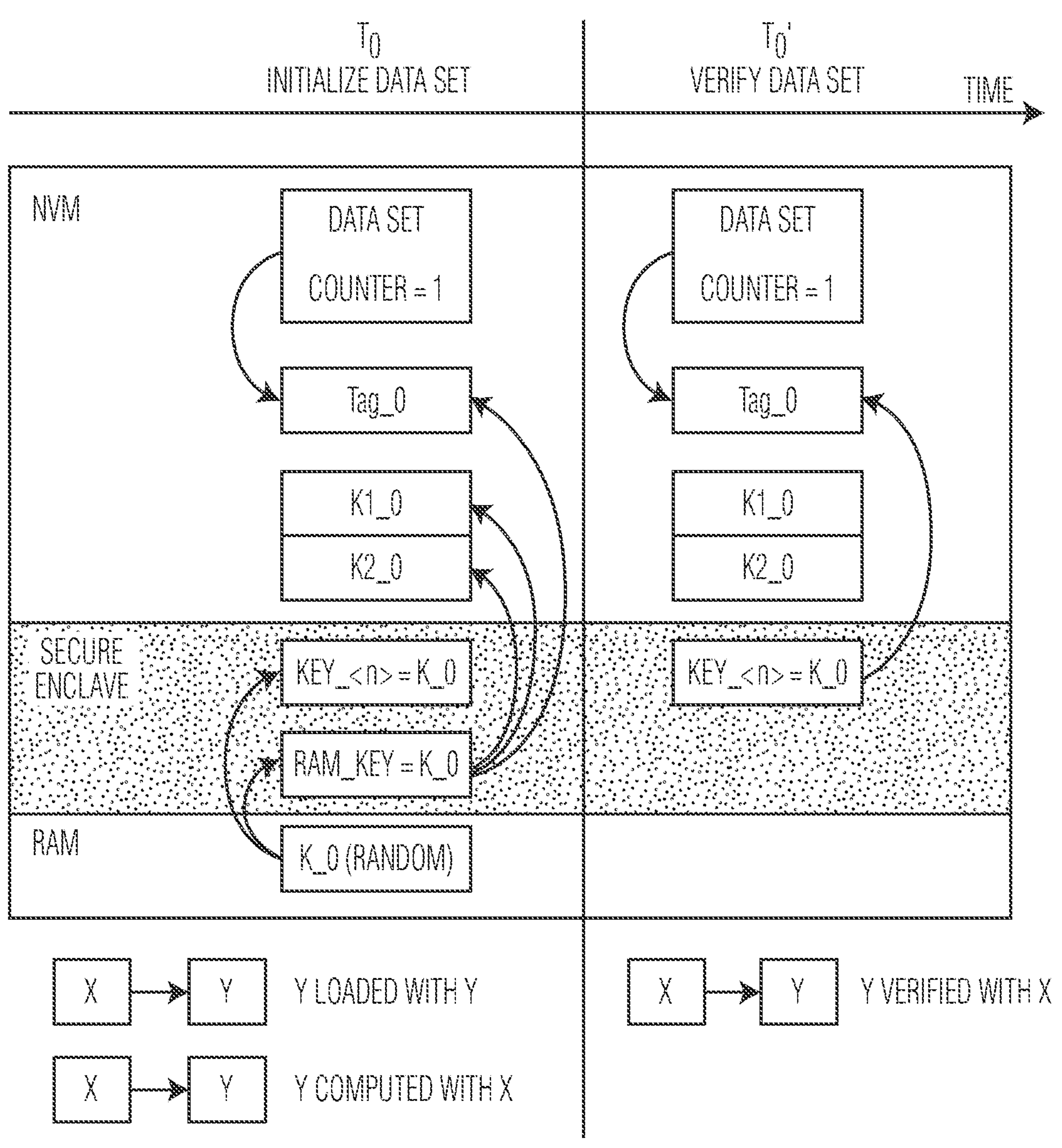
FIG. 6 is a flow diagram illustrating exemplary activities for initializing and verifying a data set in a system of the type shown in FIG. 1.

Also in accordance with the present disclosure, FIG. 6 illustrates one exemplary way for how assets may be used and updated when initializing and verifying a data set (at different points of time). The left side of FIG. 6 shows how a data set may be initialized, and the right side of FIG. 6 shows how a data set may be verified. From the bottom of the left side, the memory (RAM) circuit from the secure enclave is used to load the NVM with K1 and K2 values and to generate the computed tag (Y) from the secure enclave side as previously discussed. From the top of the left side the counter is initialized by setting the counter equal to 1 and the associated tag (X) for the counter set to Tag_0. From the top of the right side of FIG. 6, to verify the data set the logic circuitry (e.g., 110 of FIG. 1) verifies the computed tag (Y) with the tag provided with tag associated with the most recent update of the data set (X).

Figure 7:
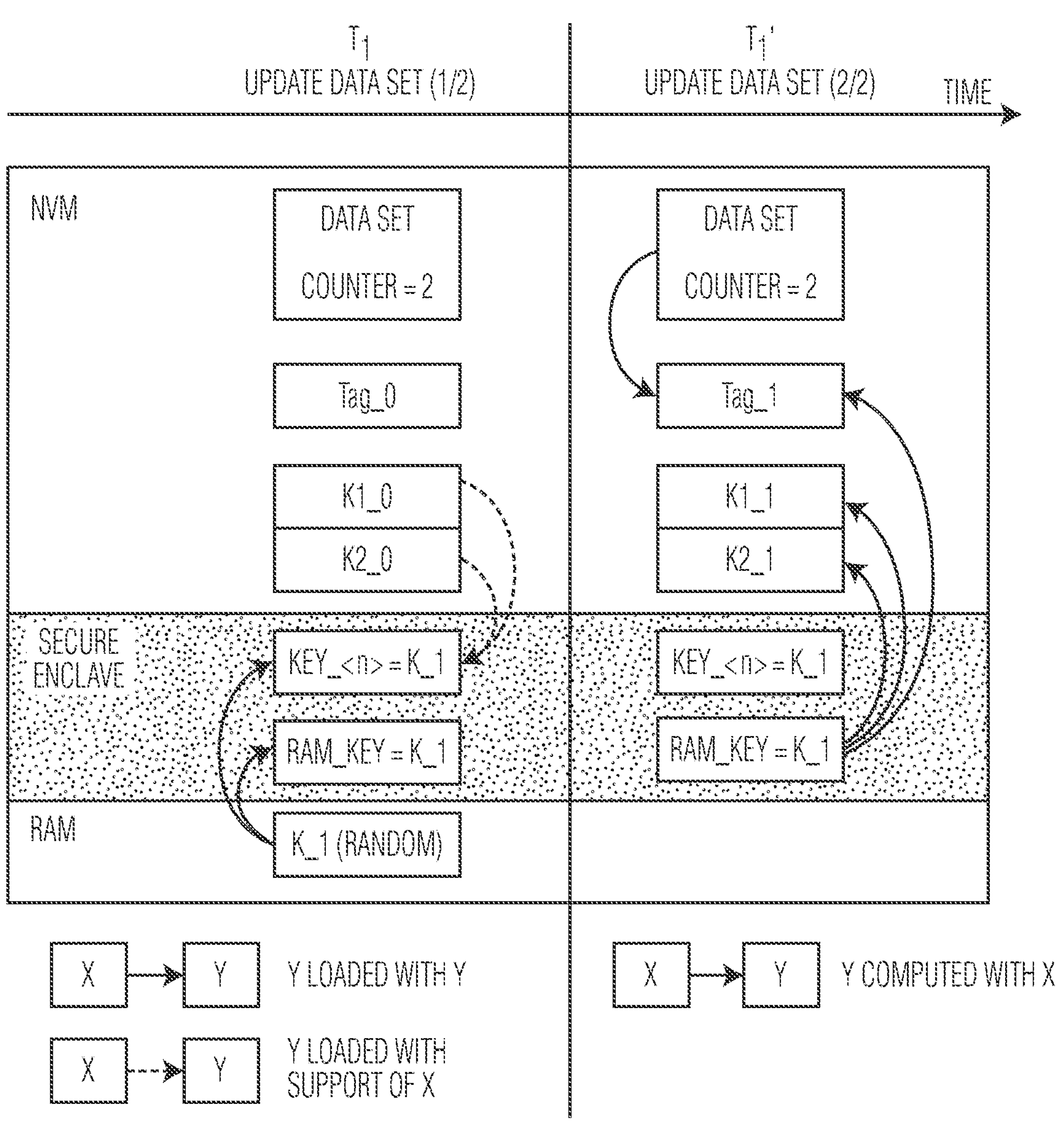
FIG. 7 is a flow diagram illustrating exemplary activities for updating a data set in a system of the type shown in FIG. 1.

FIG. 7 uses a type of data diagram that is similar to the one shown in FIG. 6, for illustrating an exemplary set of activities for updating a data set in a system of the type implemented in FIG. 1.

Alternative example embodiments and extensions may also be used in combination with the above-discussed examples and aspects and/or as alternatives, as exemplified below and referred to as example option A and example option B. The first option in this regard (example option A) is for protecting K1, K2 throughout encryption. In connection with this further example embodiment, the protection makes use of an additional encryption key to protect the sub keys K1 and K2 from being used in case the SHE secure boot failed. With the previously-described example, if an adversary manages to execute a malware in the device, he would be able to generate a valid CMAC over an outdated data set: the change would be to update the counter value. Assuming a malware cannot execute in the device if the SHE secure boot is configured, if the keys K1 and K2 are stored encrypted in NVM, and if the decryption key cannot be used because the secure boot verification failed, the adversary will not be able to compute a CMAC over any random data set. To implement this alternative example (Option A), a second user key KEY_<m> (with m∈[1, 10] and m≠n) is provisioned with a 128-bit random and with the security attributes listed in the below Table 11.

TABLE 3

| Encryption key security flags | |
|---|---|
| Security flag | Value |
| WRITE_PROTECTION | 0 |
| BOOT_PROTECTION | 1 |
| DEBUGGER_PROTECTION | 1 (recommended) |
| KEY_USAGE | 0 |
| VERIFY_ONLY | 0 (not used) |
| WILDCARD | 1 |

As an additional decryption step may be used in the CMAC key update process of FIG. 3 in the event that the SHE secure boot fails, the sub keys K1 and K2 are not available to proceed further. Accordingly, an alternative CMAC key update process with secure boot protection, also in accordance with the present disclosure, uses a modification of the process discussed in connection with FIG. 3. With reference to block 330 of FIG. 3, this step may be understood by adding, after block 330, computations of K1* and K2* as follows: compute K1 as being equal to $DEC_{KEY\_<m>}$ (K1*), and compute K2 as being equal to $DEC_{KEY\_<m>}$ (K2*). These computations of K1* and K2* occur between the activities shown in blocks 330 and 325 of FIG. 3.

Consistent with the above additional decryption step, one additional encryption step is to be used in the CMAC generation process of FIG. 4. Accordingly, an alternative CMAC generation process with secure boot protection, also in accordance with the present disclosure, uses a modification of the process discussed in connection with FIG. 4. With reference to block 440 of FIG. 4, this step may be understood by adding, before after block 440, computations of K1* and K2* as follows: compute K1 as being equal to $ENC_{KEY\_<m>}$ (K1*), and compute K2 as being equal to $ENC_{KEY\_<m>}$ (K2*). These computations of K1* and K2* occur between the activities shown in blocks 410 and 440 of FIG. 4.

The second option (example option A) is for allowing single-shot counter to be incremented to a pre-defined configuration, thereby protecting a next key through encryption. For this alternate implementation, it may be assumed that: i) $K_{AuthID}$ is not equal to the key used for verification of the counter (analogous to the above implementation option A), i.e. a different key is used to perform key updates; and ii) a secure enclave implementation allows to restrict key usage of a key to "verification only", hence a key for which this option is enabled cannot be used to generate new MAC tags.

After a counter value and the corresponding key for verification has been updated, the counter update algorithm is extended by using an exemplary set of five steps. They are as follows: 1) After generating $K_1$ and $K_2$, a random key $K_F$ is generated for verification of a future counter value; 2) Messages $M_1$. $M_2$ and $M_3$ are generated in accordance to the SHE specification, wherein $K_F$ is encrypted in place of $K_{ID'}$; 3) Messages $M_1$ through $M_3$ are stored in NVM; 4) Sub keys $K_1$ and $K_2$ are discarded after generation of $M_1$ through $M_3$, or after storing $M_1$ through $M_3$ in NVM; 5) A verification tag over a data set containing a future counter value is generated, using $K_F$ as the key for the MAC tag.

This above-described alternative implementation may be considered in certain use-cases. As one such example, the data set may resemble a configuration that will completely disable the application, e.g. for the purpose of decommissioning and/or after an accident occurred. As another example, to further restrict counter updates on a system, it may be desirable to only allow single-shot counter increments using a pre-defined value. A local system policy may further restrict the use of the key to protect messages $M_1$ through $M_3$, such that they cannot be generated locally, but by an external system.

Also in accordance with the present disclosure and as another example of an alternative and/or supplemental aspect for use with the above-described examples, a Failsafe mode is provided. This aspect, which may be referred to as Option C, is to address certain scenarios or applications where it may be desirable to be able to resort to a "known good", or generally, an alternate configuration state (e.g. if after an update of an application's configuration, the application exposes abnormal behavior). For the purpose of allowing such alternate configuration, Option C may be characterized as sub-options (or Options C.1 and C.2) with each being based on Options A and B.

Option C.1 uses a mix of the aspects discussed above in connection with Options A and B, as follows. Upon every counter update, the following three additional steps are conducted: First, Keys K1 and K2 are generated, together with a set of messages M1 through M3. K1 and K2 are stored in encrypted form, protected by a Key that is usable only after successful secure boot (as described in Option A). Second, Messages M1 through M3 do not need to be protected, or may even be stored in external memory (like described in Option B). Third, a MAC tag is generated for the known-good data set, using the (future) key contained in encrypted message M2. The data set and key information contains a future counter value (i.e. a counter value exceeding the current counter value). Should an error condition occur, messages M1 through M3 are submitted to the security subsystem to execute the key update protocol and to allow the known-good data set to be installed. Notice that this may be done independent from access to K1 and K2, i.e. even in situations in which secure boot fails.

Option C.2 is to allow for alternate configurations with same counter value. Analogous to creating an authentication tag for a dataset to use during normal operation, an alternate and/or known-good dataset may be stored with a similar counter value. In such case, there would exist two or more alternate data sets having the same counter value. A convention, such as extending the counter value through a secondary counter, may be defined to distinguish amongst different alternatives of the same configuration.

As a further example aspect of the present disclosure, an additional feature permits for use of a generic secure enclave (such as 120 of FIG. 1). Because secure enclaves, whether integrated in a larger system on a chip (SoC) or as a standalone device (e.g. secure elements), do not always support the SHE specification, this further example aspect can be implemented on such "generic" secure enclaves by using a proprietary or standard API if the following several features are made available for implementation in the system: a random number generator; a set of keys managed by the secure enclave with specific key properties (e.g., a unique identifier, a key update counter that is to be augmented every time the key material is updated within the secure enclave, and usage restriction settings that enable a key to be used only for CMAC verification operations); a service to securely import or update an existing key value based on the knowledge of that key value but without exposing it to the application (e.g. by using a derived key as proposed in the SHE specification); and generic cryptographic services to calculate and verify a CMAC over any random data; generic cryptographic services to encrypt and decrypt any random data. Optionally, a further feature may be made available with the above features, and this feature is for Key usage restrictions based on authentication results (e.g. secure boot).

Accordingly, the above discussion describes and/or illustrates examples and aspects useful for implementing the detailed implementations according to the present disclosure by way of various circuits or circuitry which may be illustrated as or using terms such as blocks, modules, element, device, system, unit, controller, modules, and/or other circuit-type depictions (e.g., as the block-form circuit structures shown in FIG. 1 and the blocks shown in various other figures). Whether as a block or module or some other term, each such term refers to a circuits or circuitry which may be used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing a certain activity and also a second activity]. Various processes or methods in this context may be recognized in connection with one or more of the functions, activities and/or steps illustrated or described in connection with the above examples and aspects.

In one example, a circuit includes a secure chip storing one of an enclave of key values linked to an update code; a memory to store an updatable data set including the update value which corresponds to and is revised with the update code; and a logic circuit. The logic circuit is to: provide a key value, based to a revision to the update code, from among the enclave of key values, generate an authentication tag as a function of the provided key value, use the authentication tag to verify that the updatable data set is valid and up to date before using the updatable data set in an application specified for the updatable data set, and update the data set by storing a replacement updatable data set in the memory circuit and including, in the replacement updatable data set, a revised update value which corresponds to a revised update code that is used to provide another key value from among the enclave of key values.

In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process (as described in connection with the one or more of the functions, activities and/or steps) is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:

a secure chip to store one of an enclave of key values linked to an update code;

a memory circuit to store an updatable data set including an update value which corresponds to and is revised with the update code; and a logic circuit to:

provide a key value from among the enclave of key values, based on a counter value of an update counter of the logic circuit and a revision to the update code, the key value unique for the counter value;

generate an authentication tag as a function of the provided key value;

use the authentication tag to verify that the updatable data set is valid and up to date before using the updatable data set in an application specified for the updatable data set; and update the data set by storing a replacement updatable data set in the memory circuit and including, in the replacement updatable data set, a revised update value which corresponds to a revised update code that is used to provide another key value from among the enclave of key values.

2. The apparatus of claim 1, wherein the update value, which corresponds to and is revised with the update code, is the same value, and wherein the authentication tag is generated as a random function of the provided key value.

3. The apparatus of claim 1, wherein the update value is bound to the update code, by a function which is traceable by the provided key value, and wherein after generation of the provided key value, the provided key value is secured in nonvolatile memory circuit to allow the logic circuit to provide said other key value from among the enclave of key values for an update of the data set.

4. The apparatus of claim 3, wherein the function is a random code generation function applied on the provided key value to generate the authentication tag.

5. The apparatus of claim 1, wherein the logic circuit is further to, in response to the authentication tag being generated, discard the provided key value.

6. The apparatus of claim 1, wherein each of the update code and the revised update code is an integer represented by N bits, and wherein each of the update value and the revised update value is an integer represented by N bits, wherein N is greater than or equal to eight.

7. The apparatus of claim 1, wherein each of the update code and the revised update code is an integer represented by X bits, and wherein each of the update value and the revised update value is an integer represented by Y bits, wherein each of X and Y is greater than or equal to eight.

8. The apparatus of claim 1, wherein each of the update code and the update value corresponds to the counter value that is represented by at least one an integer having a number of bits that is greater than or equal to 12 and that is augmented with each instance in which the logic circuit is to provide one of the key values from among the enclave of key values.

9. The apparatus of claim 1, further including control circuitry having the logic circuit and other circuitry, the other circuitry to run an application-specific program that uses the updatable data set, and wherein said one of the enclave of key values is not exposed to the application-specific program or to the other circuitry.

10. The apparatus of claim 9, wherein the revised update value is provided based on a protocol carried out by the control circuitry, the protocol including:

using a first set of messages that specify an identifier of one of the key values to update, wherein the generated authentication tag is a function of the specified identifier;

using a second set of messages to verify that said one of the key values to update has completed successfully; and in response to verification of said one of the key values updating successfully, replacing: said one of the key values, security flags linked to a status of the authentication tag, and the update code with Previously Presented values securely embedded with certain of the first and second sets of messages.

11. The apparatus of claim 1, wherein the authentication tag is a cipher-based message authentication code.

12. The apparatus of claim 1, wherein the logic circuit is further to transition to a data-set protection mode before generating the authentication tag as a function of the provided key value.

13. The apparatus of claim 1, wherein the logic circuit is to use the provided key value to provide verification via use of the authentication tag over the data set, and the authentication tag is to be accessible by the logic circuit only for said verification.

14. The apparatus of claim 1, wherein the updatable data set includes the update value as an M-bit value encoded in an N-bit word, wherein M and N are integers, N is greater than or equal to thirty two.

15. The apparatus of claim 1, wherein the logic circuit is further to set security flag value which is selected from among a plurality of security flag values to indicate a status of the authentication tag, wherein the plurality of security flag values include at least two of the following: a boot_protection status; a verification_only status; a key_usage status; and a debugger protection status.

16. The apparatus of claim 1, further including an electronic control unit installed in a vehicle, wherein the secure chip, the memory circuit and the logic circuit are integrated with or part of a computing processor within the electronic control unit.

17. The apparatus of claim 1, further including a vehicle electronic control unit, wherein the secure chip, the memory circuit, wherein the logic circuit are integrated with or as part of a secure zone of circuitry within the vehicle electronic control unit, and wherein the secure zone of circuitry is to store and manage at least one of the enclave of key values consistent with a specification or standard for management of security keys within vehicles.

18. The apparatus of claim 16, further including a vehicle electronic control unit including a microcontroller, wherein the secure chip, the memory circuit, wherein the logic circuit are part of the single-chip microcontroller.

19. A method comprising:

storing, via a secure chip, one of an enclave of key values linked to an update code;

storing, via a memory circuit, an updatable data set including the update value which corresponds to and is revised with the update code; and via a logic circuit:

providing a key value, based on a revision to the update code, from among the enclave of key values;

generating an authentication tag as a function of the provided key value;

using the authentication tag to verify that the updatable data set is valid and up to date before using the updatable data set in an application specified for the updatable data set; and updating the data set by storing a replacement updatable data set in the memory circuit and including, in the replacement updatable data set, a revised update value which corresponds to a revised update code that is used to provide another key value from among the enclave of key values; and wherein:

each of the update code and the revised update code is an integer represented by N bits;

each of the update value and the revised update value is an integer represented by N bits; and N is greater than or equal to eight.

20. A nontransitory computer-readable medium including instructions which, when executed by a computing processor, cause the computing processor to perform a method comprising:

storing, via a secure chip, one of an enclave of key values linked to an update code;

storing, via a memory circuit, an updatable data set including the update value which corresponds to and is revised with the update code; and via a logic circuit:

providing a key value, based on a counter value of an update counter of the logic circuit and a revision to the update code, from among the enclave of key values, the key value unique for the counter value;

generating an authentication tag as a function of the provided key value;

using the authentication tag to verify that the updatable data set is valid and up to date before using the updatable data set in an application specified for the updatable data set; and updating the data set by storing a replacement updatable data set in the memory circuit and including, in the replacement updatable data set, a revised update value which corresponds to a revised update code that is used to provide another key value from among the enclave of key values.

* * * * *